(12) United States Patent
Lee

(10) Patent No.: US 9,081,180 B2
(45) Date of Patent: Jul. 14, 2015

(54) DISPLAY APPARATUS AND METHOD FOR VEHICLE

(71) Applicant: Hyundai Motor Company, Seoul (KR)

(72) Inventor: Jong Bok Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/300,510

(22) Filed: Jun. 10, 2014

(65) Prior Publication Data

US 2015/0168718 A1    Jun. 18, 2015

(30) Foreign Application Priority Data

Dec. 18, 2013 (KR) .......................... 10-2013-0157983

(51) Int. Cl.
*G02B 27/14* (2006.01)
*G09G 5/00* (2006.01)
*G02B 27/01* (2006.01)

(52) U.S. Cl.
CPC ............ *G02B 27/0101* (2013.01); *G02B 27/01* (2013.01); *G02B 27/0149* (2013.01); *G02B 2027/013* (2013.01)

(58) Field of Classification Search
CPC . G02B 27/01; G02B 27/0101; G02B 27/0149
USPC .......................................... 359/630, 631, 633
See application file for complete search history.

(56) References Cited

U.S. PATENT DOCUMENTS 4,697,879 A * 10/1987 Gerbe .............................. 345/7

FOREIGN PATENT DOCUMENTS

| JP | 4907744 B1 | 4/2012 |
|---|---|---|
| JP | 2013-025205 A | 2/2013 |
| KR | 10-2008-0050669 | 6/2008 |
| KR | 20100078688 A | 7/2010 |
| KR | 10-2011-0136947 | 12/2011 |
| KR | 20120051831 A | 5/2012 |

* cited by examiner

*Primary Examiner* — William Choi
(74) *Attorney, Agent, or Firm* — Mintz Levin Cohn Ferris Glovsky and Popeo, P.C.; Peter F. Corless

(57) ABSTRACT

A display apparatus and method for a vehicle are provided. The display apparatus includes a laser scanning projector that projects an image onto a predetermined projection area and a first mirror that reflects the projected image. A second mirror reflects the image reflected from the first mirror and a third mirror reflects the image reflected from the second mirror. A first curved screen displays the image reflected from the third mirror and a fourth mirror is disposed between the laser scanning projector and the first mirror. A second curved screen displays an image reflected from the fourth mirror. A controller determines the image displayed on the first curved screen and the image displayed on the second curved screen. The fourth mirror is rotated by a motor with respect to a rotation shaft and selectively reflects the projected images.

17 Claims, 3 Drawing Sheets

DISPLAY APPARATUS AND METHOD FOR VEHICLE

CROSS-REFERENCE TO RELATED APPLICATION

This application claims priority to and the benefit of Korean Patent Application No. 10-2013-0157983 filed in the Korean Intellectual Property Office on Dec. 18, 2013, the entire contents of which are incorporated herein by reference.

BACKGROUND (a) Field of the Invention

The present invention relates to a display apparatus for a vehicle and a method of displaying outputting images of the display apparatus.

(b) Description of the Related Art

In general, a head-up display (HUD) apparatus has been developed to provide flight information to an airplane pilot, and the HUD apparatus is mounted within an aircraft. Recently, the HUD apparatus has been applied to a vehicle to conveniently indicate driving information of the vehicle to a driver. The HUD apparatus applied to the vehicle projects a display image including driving information onto a windshield glass. The virtual image corresponding to the display image projected onto the windshield glass is visually recognized by the driver. Accordingly, the driver may recognize driving information while maintaining a forward gaze and thus, improving convenience and safety for the driver.

A cluster apparatus provides vehicle speed information, engine speed information, coolant temperature information, fuel level information, and operating state information of various devices to the driver using various lamps and pointers. Accordingly, research for displaying this cluster information as an image is being actively conducted. To respectively display the driving information on the windshield glass and the cluster apparatus, two display apparatuses are required. However, when the two display apparatuses are installed within the vehicle, production cost, power consumption, and installation space increase.

The above information disclosed in this section is merely for enhancement of understanding of the background of the invention and therefore it may contain information that does not form the prior art that is already known in this country to a person of ordinary skill in the art.

SUMMARY

The present invention provides a display apparatus for a vehicle having advantages of simultaneously providing two different images using a single laser scanning projector and a method of outputting images of the display apparatus.

A display apparatus for a vehicle according to an exemplary embodiment of the present invention may include: a laser scanning projector configured to project an image onto a predetermined projection area; a first mirror configured to reflect the image projected from the laser scanning projector; a second mirror configured to reflect the image reflected from the first mirror; a third mirror configured to reflect the image reflected from the second mirror; a first curved screen configured to display the image reflected from the third mirror; a fourth mirror disposed between the laser scanning projector and the first mirror; a second curved screen configured to display an image reflected from the fourth mirror; and a controller configured to determine the image displayed on the first curved screen and the image displayed on the second curved screen, wherein the fourth mirror may be rotated with respect to a rotation shaft according to an operation of a motor and selectively reflects the images projected from the laser scanning projector.

The controller may be configured to operate the laser scanning projector and the motor to alternately display the images displayed on the first and second curved screens at every predetermined time. In addition, the controller may be configured to operate the motor to rotate the fourth mirror at a predetermined angle at every predetermined time. The first, second, third, and fourth mirrors may be plane mirrors. The controller may be configured to adjust output timing of laser beams output from the laser scanning projector based on shapes of the first and second curved screens. The first curved screen may be a windshield glass and the second curved screen may be disposed on one surface of a dashboard.

The laser scanning projector may include a laser generator configured to output laser beams, a laser combiner configured to combine the laser beams projected from the laser generator, and a MEMS (microelectromechanical systems) scanner configured to project the image onto the predetermined projection area by scanning the laser beams. The MEMS scanner may include a MEMS mirror configured to scan the laser beams. The controller may also be configured to adjust the direction of the laser beams scanned by the MEMS mirror based on curvature values of the first and second curved screens.

According to an exemplary embodiment of the present invention, it may be possible to simultaneously provide two different images using the single laser scanning projector. Production cost, power consumption, and installation space may be reduced using the single laser scanning projector. In addition, by using the laser scanning projector, aspherical mirrors corresponding to the shapes of the curved screens may be omitted and an additional device to match a focal point may also be omitted.

DESCRIPTION OF SYMBOLS

Figure 1:
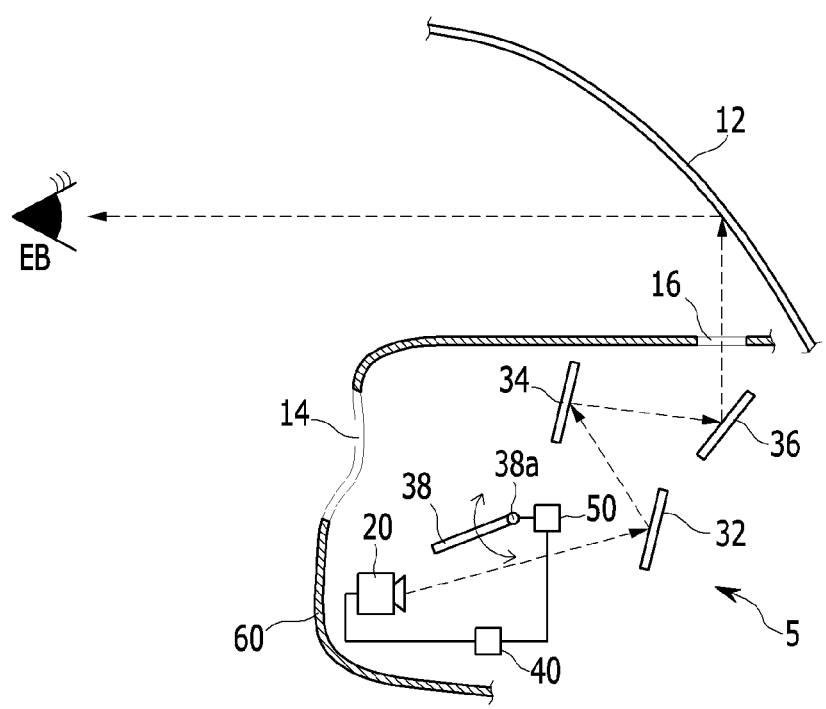
FIG. 1 and FIG. 2 are exemplary schematic diagrams of a display apparatus for a vehicle according to an exemplary embodiment of the present invention.

5: Display apparatus
12: First curved screen
14: Second curved screen
20: Laser scanning projector
32: First mirror
34: Second mirror
36: Third mirror
38: Fourth mirror
40: Controller
50: Motor
60: Dashboard

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. Further, since each component shown in the drawings is arbitrarily illustrated for easy description, the present invention is not particularly limited to the components illustrated in the drawings.

Figure 2:
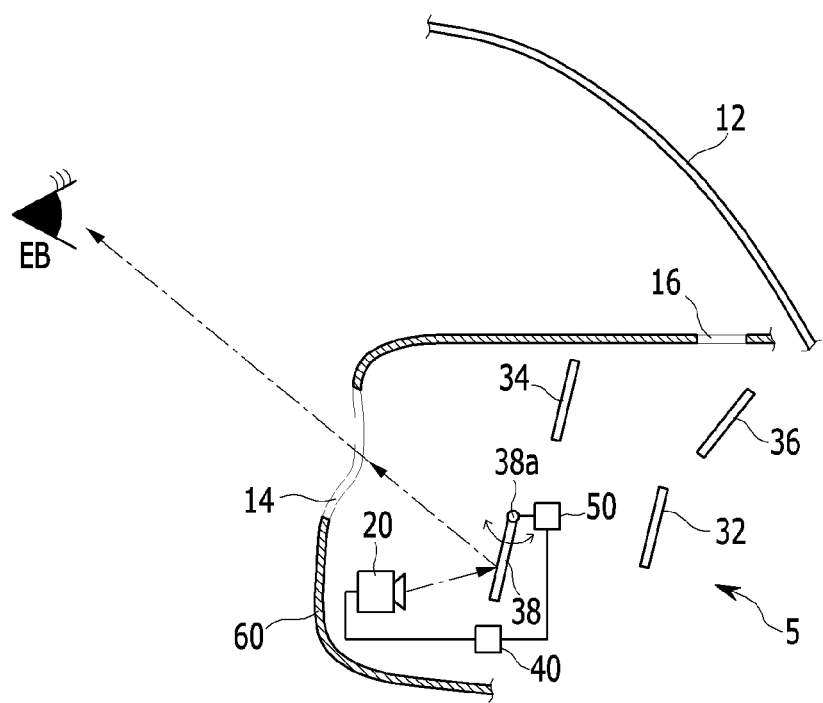
Figure 3:
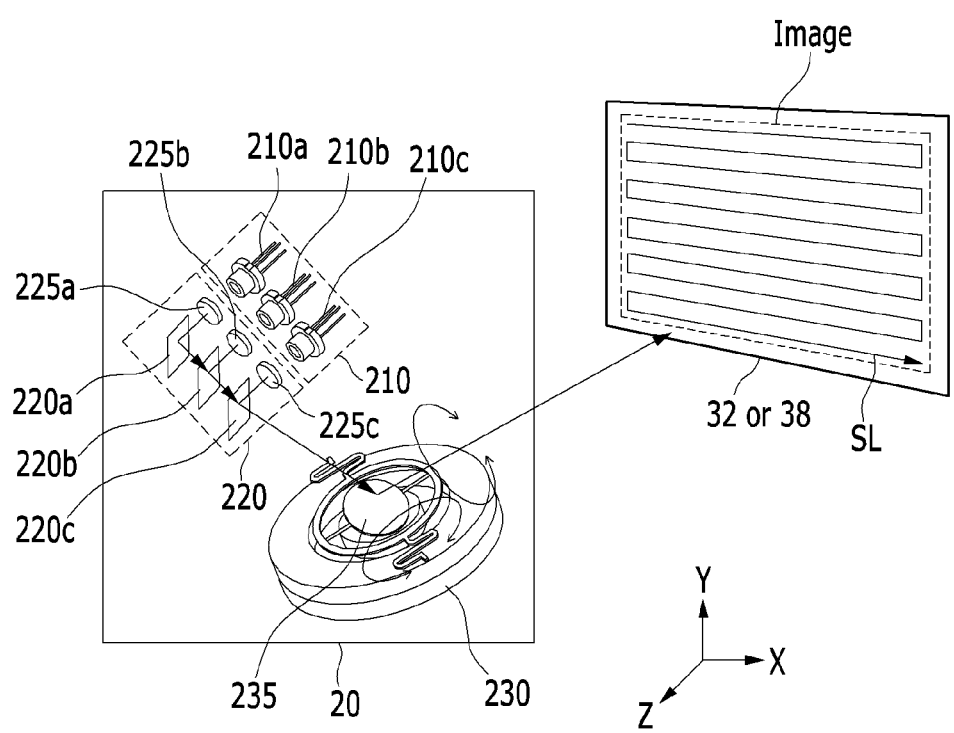
FIG. 3 is an exemplary schematic diagram of a laser scanning projector according to an exemplary embodiment of the present invention.

FIG. 1 and FIG. 2 are exemplary schematic diagrams of a display apparatus for a vehicle according to an exemplary embodiment of the present invention. FIG. 3 is an exemplary schematic diagram of a laser scanning projector according to an exemplary embodiment of the present invention. Throughout the specification, an axis of the horizontal direction of an image output from a laser scanning projector 20 is denoted as an x-axis, and the axis of the vertical direction of the image is denoted as a y-axis. Images displayed on a first curved screen 12 are indicated by dotted lines in FIG. 1, and images displayed on a second curved screen 14 are indicated by one-point chain lines in FIG. 2.

As shown in FIG. 1 and in FIG. 2, a display apparatus 5 for a vehicle according to an exemplary embodiment of the present invention may include the first curved screen 12, the second curved screen 14, the laser scanning projector 20, a first mirror 32, a second mirror 34, a third mirror 36, a fourth mirror 38, and a controller 40.

The first curved screen 12 may be a windshield glass, and the second curved screen 14 may be provided on one surface of a dashboard 60. The second curved screen 14 may be made of a transparent acryl material. Images are projected from the laser scanning projector 20 onto the first curved screen 12 and the second curved screen 14, and may be visually recognized by a user such as a driver through a predetermined eye box EB. The images projected onto the first curved screen 12 may include vehicle speed information, route guidance information, and the like. That is, the images projected onto the first curved screen 12 may be images corresponding to information provided from an existing head-up display apparatus.

Further, the images projected onto the second curved screen 14 may include vehicle speed information, engine speed information, coolant temperature information, fuel level information, accumulated distance information, trip distance information, operating state information of lamps (e.g., turn signal lamps or high beam lamps), and operating state information of various devices (e.g., doors, seat belts, or a battery). In other words, the images projected onto the second curved screen 14 may be images that correspond to information provided from an existing cluster apparatus.

Referring to FIG. 3, the laser scanning projector 20 may include a laser generator 210, a laser combiner 220, and a microelectromechanical systems (MEMS) scanner 230. The laser generator 210 may include a red laser source 210a configured to project a red laser beam, a green laser source 210b configured to project a green laser beam, and a blue laser source 210c configured to project a blue laser beam. Each of the red laser source 210a, the green laser source 210b, and the blue laser source 210c may be configured to project laser beams based on control signals output from the controller 40. Such different laser beams may be mixed to reproduce a variety of colors. Further, due to high directionality, the laser beams may move in a substantially straight line without spreading. When using the laser beams instead of a fluorescent lamp, it may be possible to achieve a pure color of an intensive single wavelength even with substantially low power according to characteristics of the laser beam. Accordingly, images having substantially high quality may be provided regardless of distances between the laser scanning projector 20 and the curved screens 12 and 14 since a focal point does not need to be matched.

The laser combiner 220 may be configured to combine laser beams projected from the laser generator 210. The laser combiner 220 may be configured to transmit the laser beams output from the laser generator 210 to the MEMS scanner 230 through a single path. The laser combiner 220 may include a plurality of collimator lenses 225a, 225b, and 225c, and a plurality of dichroic mirrors 220a, 220b, and 220c. The plurality of collimator lenses 225a, 225b, and 225c may be disposed in a projection direction of the laser beams projected from the laser generator 210. The plurality of collimator lenses 225a, 225b, and 225c may be configured to refract the laser beams to generate parallel laser beams.

A dichroic mirror may be configured to reflect laser beams in a specific frequency band and pass laser beams of frequencies other than the specific frequency band (e.g., allow the laser beams to pass there through). In particular, the dichroic mirror 220a that corresponds to the projection direction of the red laser source 210a may be configured to reflect laser beams of a red frequency band, and pass laser beams of frequencies other than the red frequency band. The dichroic mirror 220b that corresponds to the projection direction of the green laser source 210b may be configured to reflect laser beams of a green frequency band, and pass laser beams of frequencies other than the green frequency band. The dichroic mirror 220c that corresponds to the projection direction of the blue laser source 210c may be configured to reflect laser beams of a blue frequency band, and pass laser beams of frequencies other than the blue frequency band.

Each of the dichroic mirrors 220a, 220b, and 220c may be configured to reflect laser beams toward the MEMS scanner 230. The MEMS scanner 230 may include a MEMS mirror 235 configured to scan laser beams along the x-axis direction and the y-axis direction, and a driving portion (not shown) connected with the controller 40. The driving portion may be configured to rotate the MEMS mirror 235 with respect the x-axis or the y-axis based on driving signals output from the controller 40. The MEMS mirror 235 may be configured to project images onto a predetermined projection area by scanning the laser beams.

The controller 40 may be implemented with one or more microprocessors executed by a predetermined program. The predetermined program may include a series of commands for performing each step included in a method for controlling the laser scanning projector 20 to display the images according to an exemplary embodiment of the present invention. In particular, the controller 40 may be configured to determine an image to be displayed on the first curved screen 12 and an image to be displayed on the second curved screen 14. The controller 40 may also be configured to output control signals to each of the laser sources 210a, 210b, and 210c to blink the laser beams (e.g., turn the laser beams on and off in a blinking manner). The controller 40 may be configured to output the driving signals to the MEMS scanner 230 to adjust the direction of the laser beams reflected by the MEMS mirror 235, such that the laser beams may form a scanning line SL.

The controller 40 may be configured to operate the laser scanning projector 20 to project the laser beams, which form an image on a reflection surface of the first mirror 32. In particular, each pixel of the image may be formed on the reflection surface of the first mirror 32 by scanning the blinked laser beams. One frame time (i.e., the time taken for the MEMS mirror to return to the original position when laser beams are sequentially scanned according to the sequential scanning technique) may be about 1/60 of a second, but is not limited thereto. The image formed on the first mirror 32 may be reflected toward the second mirror 34. The second mirror 34 may be configured to reflect the laser beams reflected from the first mirror 32 toward the third mirror 36. The third mirror 36 may be configured to reflect the laser beams reflected from the second mirror 34 toward the first curved screen 12. The laser beams reflected from the third mirror 36 may be passed through a screen 16 formed at an upper surface of the dashboard 60, and may be projected onto the first curved screen 12.

The controller 40 may be configured to adjust output timing of the laser beams output from the laser scanning projector 20 based on the shape of the first curved screen 12. In other words, the controller 40 may be configured to adjust the direction of the laser beams scanned by the MEMS mirror 235 based on the curvature value of the first curved screen 12. Accordingly, the first, second, and third mirrors 32, 34, and 36 may be plane mirrors rather than aspherical mirrors. Since it may be difficult to produce aspherical mirrors, the production cost may be reduced when plane mirrors are used. In addition, by using the first, second, and third mirrors 32, 34, and 36, the depth of the laser beam required for displaying an image on the first curved screen 12 may be adjusted to reduce the size of the display apparatus 5 installed within the vehicle.

The controller 40 may be configured to operate the laser scanning projector 20 to project laser beams that form an image on the reflection surface of the fourth mirror 38 by the same method as the method of forming images on the reflection surface of the first mirror 32. An image formed on the fourth mirror 38 may be reflected toward the second curved screen 14. The controller 40 may be configured to adjust output timing of the laser beams output from the laser scanning projector 20 based on the shape of the second curved screen 14. Accordingly, the fourth mirror 38 may be a plane mirror rather than an aspherical mirror that corresponds to the shape of the second curved screen 14.

A motor 50 may be configured to rotate the fourth mirror 38 with respect to a rotation shaft 38a based on driving signals output from the controller 40. The motor 50 may be configured as a step motor capable of rotating the fourth mirror 38 at a predetermined angle. The fourth mirror 38 may be rotated with respect to the rotation shaft 38a based on the operation of the motor 50, to selectively reflect images projected from the laser scanning projector 20.

The controller 40 may be configured to determine an image to be displayed on the first curved screen 12 and an image to be displayed on the second curved screen 14, and operate the laser scanning projector 20 to alternately display the images at every predetermined time. The predetermined time may be about 1/60 of a second as one frame time, but is not limited thereto. The controller 40 may be configured to operate the motor 50 to rotate the fourth mirror 38 at the predetermined angle at every predetermined time. The predetermined angle may be set by a person of ordinary skill in the art in consideration of positions of the laser scanning projector 20, the first mirror 32, and the fourth mirror 38.

As described above, according to an exemplary embodiment of the present invention, it may be possible to simultaneously provide multiple different images using the single laser scanning projector 20. Further, production cost, power consumption, and installation space may be reduced using the single laser scanning projector 20. In addition, by using the laser scanning projector 20, aspherical mirrors that correspond to the shapes of the curved screens may be omitted, and an additional device to match a focal point may not be necessary.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:
1. A display apparatus for a vehicle, comprising:
   a laser scanning projector configured to project an image onto a predetermined projection area;
   a first mirror configured to reflect the image projected from the laser scanning projector;
   a second mirror configured to reflect the image reflected from the first mirror;
   a third mirror configured to reflect the image reflected from the second mirror;
   a first curved screen configured to display the image reflected from the third mirror;
   a fourth mirror disposed between the laser scanning projector and the first mirror;
   a second curved screen configured to display an image reflected from the fourth mirror; and a controller configured to determine the image displayed on the first curved screen and the image displayed on the second curved screen, wherein the fourth mirror is rotated by a motor with respect to a rotation shaft and is configured to selectively reflect the images projected from the laser scanning projector.

2. The display apparatus of claim 1, wherein the controller is configured to operate the laser scanning projector and the motor to alternately display the images displayed on the first and second curved screens at every predetermined time.

3. The display apparatus of claim 2, wherein the controller is configured to operate the motor to rotate the fourth mirror at a predetermined angle at every predetermined time.

4. The display apparatus of claim 1, wherein the first, second, third, and fourth mirrors are plane mirrors.

5. The display apparatus of claim 4, wherein the controller is configured to adjust output timing of laser beams output from the laser scanning projector based on shapes of the first and second curved screens.

6. The display apparatus of claim 1, wherein the first curved screen is a windshield glass and the second curved screen is disposed on one surface of a dashboard.

7. The display apparatus of claim 1, wherein the laser scanning projector includes:
 a laser generator configured to output laser beams;
 a laser combiner configured to combine the laser beams projected from the laser generator; and
 a MEMS (microelectromechanical systems) scanner configured to project the image onto the predetermined projection area by scanning the laser beams.

8. The display apparatus of claim 7, wherein the MEMS scanner includes a MEMS mirror configured to scan the laser beams.

9. The display apparatus of claim 8, wherein the controller is configured to adjust the direction of the laser beams scanned by the MEMS mirror based on curvature values of the first and second curved screens.

10. A method of outputting images of a display apparatus of a vehicle, comprising:
 projecting, by a controller, an image onto a predetermined projection area using a projector, wherein the projected image is reflected by a first mirror;
 displaying, by the controller, an image reflected from a third mirror on a first curved screen, wherein the image reflected form the third mirror is reflected from a second mirror;
 displaying, by the controller, an image on a second curved screen reflected from a fourth mirror disposed between the projector and the first mirror; and
 determining, by the controller, the image displayed on the first curved screen and the image displayed on the second curved screen,
 rotating, by the controller, the fourth mirror with respect to a rotation shaft and selectively reflecting the projected images.

11. The method of claim 10, further comprising:
 alternately displaying, by the controller, the images displayed on the first and second curved screens at every predetermined time.

12. The method of claim 11, further comprising:
 rotating, by the controller, the fourth mirror at a predetermined angle at every predetermined time.

13. The method of claim 10, wherein the first, second, third, and fourth mirrors are plane mirrors.

14. The method of claim 13, further comprising:
 adjusting, by the controller, output timing of laser beams output from the laser scanning projector based on shapes of the first and second curved screens.

15. The method of claim 10, further comprising:
 outputting, by the controller, laser beams;
 combining, by the controller, the projected laser beams; and
 projecting, by the controller, the image onto the predetermined projection area by scanning the laser beams using a MEMS (microelectromechanical systems) scanner.

16. The method of claim 15, wherein the MEMS scanner includes a MEMS mirror configured to scan the laser beams.

17. The method of claim 16, further comprising:
 adjusting, by the controller, the direction of the laser beams scanned by the MEMS mirror based on curvature values of the first and second curved screens.

* * * * *